United States Patent [19]

Gehrig et al.

[11] Patent Number: 4,663,178

[45] Date of Patent: May 5, 1987

[54] EASILY RECONSTITUTABLE POWDERED SOUR-CREAM-TYPE PRODUCT

[75] Inventors: Thomas C. Gehrig; David W. Mortemore, both of Scottsdale, Ariz.

[73] Assignee: Conagra, Inc., Omaha, Nebr.

[21] Appl. No.: 468,017

[22] Filed: Feb. 18, 1983

[51] Int. Cl.$^4$ .................. A23C 13/16; A23C 23/00
[52] U.S. Cl. ................... 426/583; 426/580; 426/586
[58] Field of Search ................. 426/583, 580, 586

[56] References Cited

U.S. PATENT DOCUMENTS

| | | |
|---|---|---|
| Re. 27,381 | 5/1972 | Little . |
| 2,719,793 | 10/1955 | Page et al. . |
| 2,832,687 | 4/1958 | Lane et al. . |
| 3,090,688 | 5/1963 | Noznick . |
| 3,355,298 | 11/1967 | Loter . |
| 3,357,838 | 12/1967 | Noznick . |
| 3,359,116 | 12/1967 | Little . |
| 3,370,955 | 2/1968 | Little . |
| 3,378,375 | 4/1968 | Little . |
| 3,397,995 | 8/1968 | Elenbogen . |
| 3,432,306 | 3/1969 | Edwards . |
| 3,437,494 | 4/1969 | Loter . |
| 3,443,960 | 5/1969 | Noznick . |
| 3,729,322 | 4/1973 | Calvert .................. 426/583 |
| 3,792,178 | 2/1974 | Noznick et al. ........ 426/583 |
| 4,288,459 | 9/1981 | Baker ..................... 426/583 |
| 4,473,594 | 9/1984 | Miller et al. ............ 426/583 |

FOREIGN PATENT DOCUMENTS 677531 8/1952 United Kingdom .

OTHER PUBLICATIONS

Effect of Frozen Storage on the Microstructure and Syneresis of Modified Tapioca Starch-Milk Gels, from Journal of Food Science, pp. 121–124, vol. 39 (1974).
Use of Sugars and Other Carbohydrates in the Food Industry, published Feb. 1955 by American Chemical Society, pp. 30–34.
Edible Starches and Starch-Derived Syrups, by Nicholas B. Petersen, published by Noyes Data Corporation, 1975, pp. 84–88 and 30–34.
Starch to Repress Syneresis of Curdlan Gel. Ishida Kinichi; Takeuchi, Tokuo abstract.

*Primary Examiner*—Sam Rosen
*Attorney, Agent, or Firm*—Willian Brinks Olds Hofer Gilson & Lione Ltd.

[57] ABSTRACT

A readily recontitutable powder, for preparing a high-stability sour-cream-type product, as well as a method for the preparation of the powder and a method for the reconstitution thereof. The powder is prepared from a low-fat, directly-acidified slurry, which is subsequently spray-dried. A hygroscopic powder (e.g., pre-gelatinized starch) is blended in; the result is a product that is low in cost, easily reconstituted, stable at room temperature as a powder, and stable when refrigerated after reconstitution.

6 Claims, No Drawings

EASILY RECONSTITUTABLE POWDERED SOUR-CREAM-TYPE PRODUCT

BACKGROUND OF THE INVENTION

1. Field of the Invention

This invention relates to a product, namely an improved sour-cream analog, as well as to a method for the preparation thereof. More specifically, the invention relates to a low-cost powdered product which can be stored on the shelf at room temperature, and which can be readily reconstituted by hand under counter-top conditions to yield a sour-cream-type product having excellent refrigerator-shelf stability. The powder is prepared by first spray-drying a low-fat, chemically "fermented" base slurry. A pre-gelatinized starch powder is blended into the spray-dried product, to both assist in the reconstitution/emulsification, and to enhance the stability of product after reconstitution.

2. Description of the Prior Art

In the past, sour cream, and sour-cream products such as dips and dressings, attained wide public favor.

Sour cream is a colloidal suspension, wherein a high-fat dairy emulsion is entrapped within a fluid protein-based coagulum. Natural sour cream has a butter-fat content of at least 18% by weight.

Natural sour cream was prepared by fermenting a dairy-base. The base was innoculated with bacteria, which caused a fermentation. As the fermentation proceeded, the acid slowly coagulated the protein in the dairy product to produce the smooth, viscous emulsion commonly recognized as sour cream.

Natural sour cream suffered, however, from a number of shortcomings.

The high-fat dairy base for sour cream was expensive. The natural fermentation process was a slow one.

Once "soured", sour cream had a limited shelf-stability, even under refrigeration. The limited shelf-life resulted from the continuing acid production by the coagulation-inducing bacteria. Even under refrigeration, the bacterial acid production continued. This limited the shelf-life for the soured product. As a result, the shelf-life of natural sour cream was typically not stable for more than about 14 days, after which whey began to exude from the coagulum.

To speed the coagulation, and to limit the continuing bacterial-acidification of the soured product, "artificial fermentation" processes were developed. The artificial fermentation consisted of adding an edible acid directly to the dairy base, under controlled conditions, to produce the desired coagulum without bacteriological action. Even artificially-fermented products were still limited to a maximum refrigerator shelf life to about two weeks before the coagulum-suspended emulsion "broke", with whey separating from the coagulum.

To gain long-term stability for a sour cream product, a number of sour-cream powders were developed. Some of these products, such as those disclosed in U.S. Pat. Nos. 3,357,838, and 3,090,688, were merely intended to be used as dry ingredients in processed foods. As such, they were not commonly regarded as products that could be reconstituted into a table-ready sour cream product. One sour-cream powder, as disclosed in U.S. Pat. No. 3,792,178, could be reconstituted, but remained stable for only a brief period. Another sour-cream powder, as disclosed in U.S. Pat. No. 3,443,960, incorporated a number of emulsifiers to permit the powder to be reconstituted with the aid of an electric mixer. The mixer provided sufficient energy-input so as to emulsify the powder/water blend. However, U.S. Pat. No. 3,443,960 did not purport to disclose a product, or teach a method, that would permit reconstitution of a sour cream powder with only hand effort.

A need continued to exist for a low-cost, product that was stable at room temperature, and that could be easily re-constituted to produce a viscous "sour cream" emulsion that exhibited excellent stability on the refrigerator shelf.

SUMMARY OF THE INVENTION

The essence of the invention involves the preparation of a low-fat, acidified base slurry, which is spray dried to produce a base powder. The base powder is blended with a pre-gelatinized starch powder. The power blend remains stable at room temperature for essentially an indeterminate period. The low fat content minimizes the product cost. The low fat content also permits an easy reconstitution of a smooth, viscous emulsion, without excessive effort. The reduced fat level provides dietary advantage, by both reducing caloric and fat intake. The low fat content, the absence of acid-producing bacteria and the inclusion of the syneresis-masking starch, combine the provide excellent refrigerator-shelf stability for the reconstituted product.

Thus, in accord with a broadest aspect of the invention, it is an object to provide a shelf-stable sour cream powder that can be easily reconstituted into a smooth, viscous sour cream product.

It is another object to provide a reconstitutable sour cream powder, which offers good refrigerator shelf stability following reconstitution.

It is a further object to provide a low-cost, powdered, sour cream-type product that can be easily reconstituted under counter-top conditions.

It is an object to provide a sour-cream-type powder that can be reconstituted by hand.

It is an object to teach a method for preparing a sour-cream-type powder that can be readily reconstituted by hand under counter-top conditions.

It is still a further object to teach a method for preparing an easily reconstitutable sour cream type powder that offers good refrigerator-shelf stability following reconstitution.

DESCRIPTION OF THE PREFERRED EMBODIMENTS

The preferred embodiment of this invention includes a readily reconstitutable powder, prepared by directly acidifying a low-fat dairy slurry, spray drying the slurry and adding pre-gelatinized starch to the spray-dried powder. The resulting powder blend can be easily reconstituted into a smooth, viscous suspension of an emulsion that exhibits the appearance and texture of natural sour cream. Addition of appropriate flavorings further permits the reconstituted product to duplicate the flavor of sour cream.

Thus, in accord with one embodiment of this invention, an easily reconstitutable powder that can be mixed with 63 to 65 parts-by-weight of water to yield 100 parts-by-weight of a sour-cream-type product is disclosed, comprising: a spray-dried emulsion having encapsulated therein a fat content adequate to provide at least 9 and not more than 14 parts-by-weight of the product; and the spray-dried emulsion further having other ingredients including protein comprising in combination at least 21 parts-by-weight of the product.

In accord with another embodiment of this invention, a method for preparing a powder moiety that can be easily re-constituted with from 1.67 to 1.75 parts of a water moiety to form a sour-cream-type product is disclosed, comprising the steps of: emulsifying a protein, fat and water blend having not more than about 9% to 14% by weight of fat; stabilizing the blend so that acid-induced coagulation of the protein fraction of the emulsion occurs at a controlled rate; acidifying the blend; spray drying the acidified blend to produce a powdered product; blending from 4 to 8 dry-parts-by-weight of an edible hygroscopic powder into the powdered product to produce the powder moiety which, when reconstituted as described above, produces a product having a fat content of about 9% to 14% by weight. The preferred embodiment utilizes a powder moiety which is reconstituted to produce a product having a fat content of about 11% by weight.

In accord with yet another embodiment of this invention, a method for preparing by hand a sour-cream analog from a powder is disclosed, comprising the steps of: homogenizing a protein, fat and water blend having about 7% to 14% by weight of fat to stabilize the blend so that acid-induced coagulation of the protein fraction of the emulsion occurs at a controlled rate; directly acidifying the blend; spray drying the acidified blend to produce a powdered product; blending from 4 to 8 dry-parts-by-weight of an edible hygroscopic powder into the powdered product to produce a powder moiety; mixing about 3 parts of the powder moiety with about 5 parts of a water moiety to form a mixture; thoroughly blending the mixture by hand to commence a coagulation of the mixture into a firm, smoothly viscous product having a fat content of about 9% to 14% by weight.

The foregoing, and other objects, feaures and advantages, will be apparent from the following, more particular, description of the preferred embodiments of the invention.

THE SPECIFICATION

The invention is a low-fat sour-cream-type product, which is stable for an indefinite period in its dry-powder form, and which can be readily reconstituted to produce a viscous, sour-cream-type product having excellent refrigerator-shelf stability.

Government regulations require that a product labeled as "sour cream" have a minimum specified fat content. For the purposes of brevity, however, the low-fat, sour-cream-type product produced according to the invention here disclosed will be referred to as "sour cream". It will be appreciated that such a designation is one of convenience only, and even though the product produced according to the invention has the appearance, flavor and texture of natural sour cream, it is really an analog thereto.

According to the invention, reconstitutable sour cream powder is prepared by initially blending a slurry of cream, buttermilk solids, nonfat dry milk, maltodextrin, modified whey and sour cream flavorings. Water is added to bring the slurry to an overall solids concentration of about 36%.

As hereafter explained, it is essential that the initial slurry have an overall fat fraction less than that of natural sour cream. It is believed that 9 to 14% by weight represents a range within which the hereafter described advantages of reconstitutability and refrigerator-shelf stability can be attained. The preferred practice of the invention employs an initial slurry with a 11% fat content. Although other fat sources could be employed, the preferred embodiment utilizes the fat contributed by the cream and the buttermilk solids.

After the other ingredients are blended, sour cream flavoring is added to fortify the taste of the final product. A preservative, namely an anti-oxidant, may optionally be added at the same time. The slurry is homogenized, and then is cooled to a temperature below 60 degrees farenheit. The maltodextrin in the mixture forms a colloidal suspension, which in combination with the homogenization-stabilization and the reduced temperature, inhibit a premature, uncontrolled coagulation of the various proteins when a blend of citric and lactic acid is subsequently added to the homogenized slurry.

The direct acidification avoids the vagaries of bacterial acidification. The direct acidification thereby provides precise control over the rate and degree of coagulation of the protein in the homogenized slurry.

After the acid is added, as the proteins in the slurry continue to coagulate, the liquid-suspension is spray-dried. As the spray drying occurs, the proteins in the slurry encapsulate the fat component, thereby producing a powder. That spray-dried powder is then blended with an edible hygroscopic powder to produce the finished sour cream powder. The added hygroscopic powder initially assures the free-flowing characteristics of the powder, and further contributes both to the reconstitutability of the sour cream powder, and to the stability of the reconstituted product. Pre-gelatinized starch is the preferred hygroscopic powder.

Although the power blend can be used as a dry ingredient for processed foods, a particular advantage of the instantly disclosed sour cream powder is realized when the powder is reconstituted to provide a full-bodied, smoothly viscous sour cream. A key aspect of the invention is the ease with which the reconstitution can be accomplished. The reconstitution is achieved by simply adding the requisite quantity of water, and hand-stirring the mixture. The limited fat content; the fine dispersion of the fat throughout the spray-dried mixture; the several emulsifying agents, including the nonfat dry milk, modified whey and pre-gelatinized starch; in combination permit the fat-component of the powder to be reconstituted, in a colloid-suspended emulsification, with unexpected ease.

The starch also acts as a body-builder, to thicken the resulting fluid. The proportion of starch in the powder blend must fall within critically narrow limits: too much starch will cause the reconstituted product to be pasty, while too little starch will result in tool low a viscosity for the finished product. To function properly, the starch should constitute 4% to 8% of the weight of the dry powder, of 1.5% to 3.0% of the weight of the reconstituted product.

Following the reconstitution step, the resulting sour cream can be stored on the refrigerator shelf for a surprisingly long period without exhibiting the syneresis commonly associated with natural sour cream, as well as with similar fluidly suspended high-fat emulsions. The stability results, in part, from the lower fat content in the product, which lowers the "stress" on the reconstituted emulsion. The pre-gelatinized starch tends to absorb moisture that may be exuded, thereby masking any syneresis that may occur. In addition, the aforementioned emulsifying agents tend to stabilize the reconstituted product. In its preferred embodiment, the product has been observed to exhibit stability for as long as three weeks.

A typical example of the practice of the invention follows:

A base slurry is prepared as follows:

|  | Base Slurry Total | Fat Only |
| --- | --- | --- |
| whipping cream solids (97% fat; 3% S.N.F.) | 10.94 | 10.61 |
| buttermilk solids (5.8% fat; 92.5% S.N.F.) | 6.76 | 0.35 |
| maltodextrin | 6.93 |  |
| non-fat dry milk solids | 6.93 |  |
| salt | 0.18 |  |
| de-lactosed whey | 3.65 |  |
| titanium dioxide | 0.27 |  |
| flavorings | 0.12 |  |
| anti-oxidant | 0.22 |  |
| water | 64.00 |  |
|  | 100.00 | 10.96% |

With the exception of the flavorings and the preservative, the ingredients are mixed with the water in a blending kettle. The flavorings and the preservative are added immediately prior to homogenization. The homogenization is conducted at 170 degrees F., through succeeding stages at 1800 p.s.i. and 500 p.s.i. The homogenization forms a stable emulsion from the mixture.

Following homogenization, the product is cooled below 60 degrees F. The reduced temperature assures that the subsequent acidification of the blend will not produce an uncontrollable coagulation of the protein fraction. At higher temperatures, the protein fraction may rapidly coagulate into discrete curds, rather than forming a smooth, continuous matrix recognizable as sour cream.

At the reduced temperature, acid is added in two stages. First, 50% food-grade lactic acid is added to reduce the pH to 4.8. Then, 30% food-grade citric acid is added to further reduce the pH to 4.3. The acidified blend is gently mixed for an additional five minutes. Coagulation of the protein fraction, into a colloidal matrix, commences with the addition of the acid.

The resulting mixture, in a viscous-fluid state, is passed through a spray dryer to remove nearly all moisture. In the preferred practice of the invention, the mixture is spray dried through a rotary disc atomizer with an inlet temperature of 190° degrees C. and and outlet temperature of 85 degrees C. Following the spray drying, the powder is cooled to room temperature.

The cooled powder is blended with a pre-gelatinized starch. In the preferred embodiment, a waxy-maize starch is employed to produce a powder blend with a dry composition as follows:

|  | Spray-Dried With Starch Total | Fat Only |
| --- | --- | --- |
| whipping cream solids (97% fat; 3% S.N.F.) | 28.85 | 27.99 |
| buttermilk solids (5.1% fat; 94.9% S.N.F.) | 17.83 | 0.91 |
| maltodextrin | 18.27 |  |
| non-fat dry milk solids | 18.27 |  |
| salt | 0.48 |  |
| de-lactosed whey | 9.62 |  |
| titanium dioxide | 0.72 |  |
| flavorings | 0.33 |  |
| anti-oxidant | 0.57 |  |

|  | Spray-Dried With Starch Total | Fat Only |
| --- | --- | --- |
| starch | 5.06 |  |
|  | 100.00 | 28.90% |

The powder mixture is then ready to be packaged and stored.

The sour-cream powder can subsequently be used by mixing approximately three parts powder with five parts of water. Water can be added to the powder at a ratio of about 1.67 to 1.75:1 to produce a mixture with the desired fluidity. The reconstitution can be readily achieved at a room temperature of about 70 to 75 degrees F. Although the reconstitution can be quickly effected with an electric mixer, only hand mixing, as with a fork or a conventional kitchen whip, is required to achieve the mixture. Following the blending, the powder/water mixture quickly sets up into a smooth, viscous blend that both looks and tastes like naturally fermented, high-fat, high-cost sour cream.

When reconstituted, the composition of the sour cream is as follows:

|  | 1.67:1 Low Dilution | | 1.75:1 High Dilution | |
| --- | --- | --- | --- | --- |
|  | Total | Fat | Total | Fat |
| whipping cream solids (97% fat; 3% S.N.F.) | 10.81 | 10.48 | 10.49 | 10.18 |
| buttermilk solids (5.0% fat; 92.5% S.N.F.) | 6.67 | 0.34 | 6.48 | 0.33 |
| maltodextrin | 6.84 |  | 6.64 |  |
| non-fat dry milk solids | 6.84 |  | 6.64 |  |
| salt | 0.18 |  | 0.17 |  |
| de-lactosed whey | 3.60 |  | 3.50 |  |
| titanium dioxide | 0.27 |  | 0.26 |  |
| flavorings | 0.12 |  | 0.12 |  |
| anti-oxidant | 0.21 |  | 0.21 |  |
| starch | 1.90 |  | 1.84 |  |
| water | 62.56 |  | 63.65 |  |
|  | 100.00 | 10.82 | 100.00 | 10.51 |

If refrigerated, the reconstituted sour cream may be stored on the shelf for several weeks without encountering syneresis. The preferred blend, as described above, has been observed to be stable for up to three weeks.

The dry-powder sour-cream product thus offers a number of advantages. It may be quickly prepared from low-cost, low-fat components. It provides a reconstitutable sour cream that can be stored indefinitely on a room-temperature shelf. It can be quickly and easily reconstituted from powder on a counter-top. Once reconstituted, the sour cream product offers an excellent shelf life without notable syneresis.

While the invention has been particularly described with reference to the preferred embodiments thereof, it will be understood by those skilled in the art that various changes in form and detail, as well as omissions, may be made therein without departing from the spirit and scope of the invention.

I claim:

1. An easily re-constitutable powder that can be mixed with 63 to 65 parts-by-weight of water to yield 100 parts-by-weight of a sour-cream-type product, comprising:

spray-dried particles of an acidified milk product emulsion comprising protein and fat, said particles having encapsulated therein a fat content adequate to provide at least 9 and not more than 11 parts-by-weight of said sour-cream-type product; and
an edible pregelatinized starch powder.

2. A powder in accord with claim 1, wherein said fat content comprises at least 10 parts-by-weight of said sour-cream-type product.

3. A powder in accord with claim 1, wherein said fat content comprises about 11 parts-by-weight of said sour-cream-type product.

4. A powder in accord with claim 1 wherein said milk product emulsion includes an edible bacteria-free acidulant so that said protein can be coagulated independent of bacteriological action.

5. A powder in accord with claim 4 wherein said acidulant comprises a blend of lactic and citric acids.

6. A powder in accord with claim 1 wherein said pregelatinized starch comprises about 1.5 to 3.0% by weight of said sour-cream-type product.

* * * * *